July 18, 1950 H. L. MUELLER Re. 23,250
CHAIN GUARD
Original Filed Jan. 2, 1948
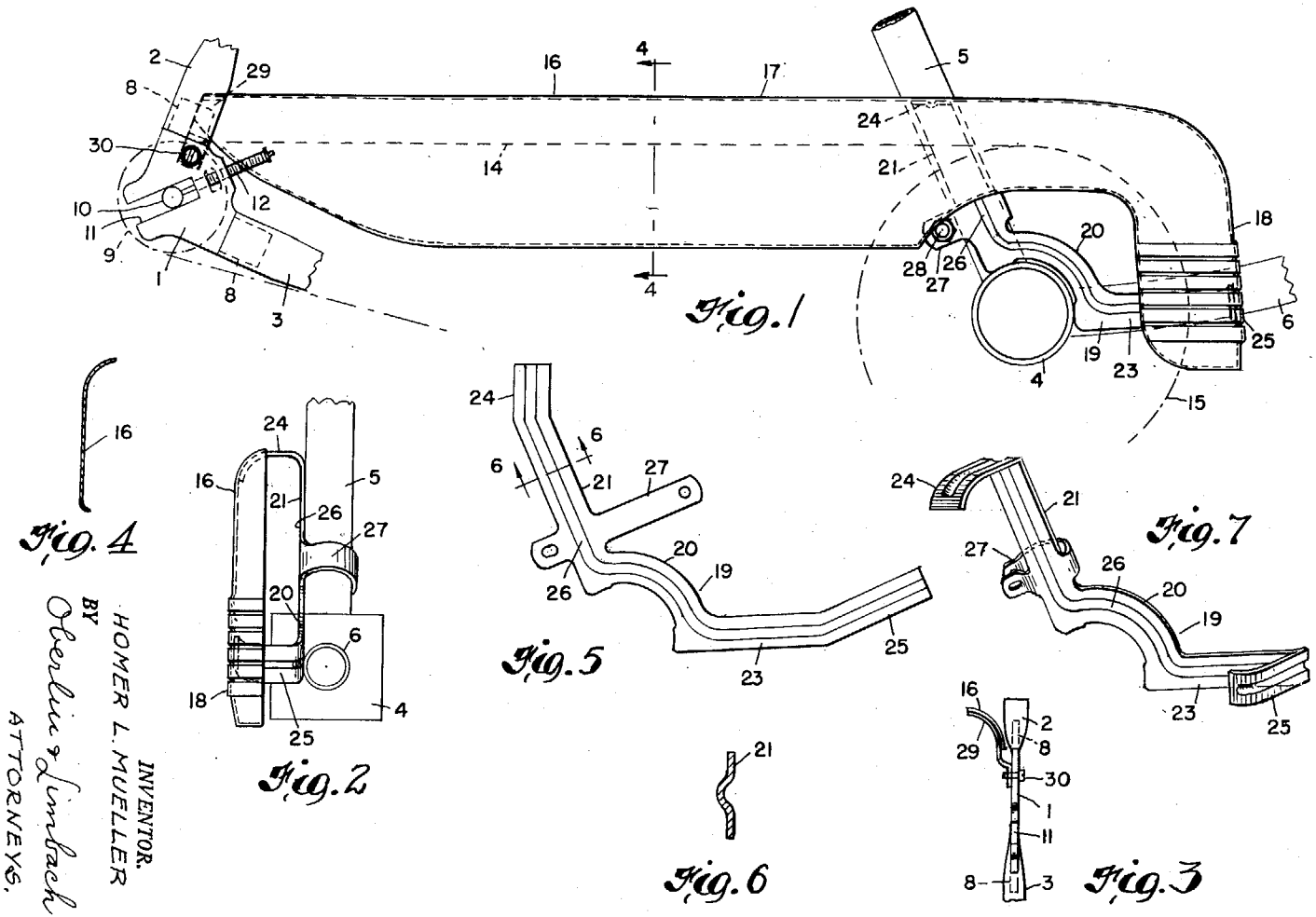
INVENTOR.
HOMER L. MUELLER
BY
Oberlin & Limbach
ATTORNEYS.

Reissued July 18, 1950

Re. 23,250

UNITED STATES PATENT OFFICE 23,250

CHAIN GUARD

Homer L. Mueller, Cleveland, Ohio, assignor to The Cleveland Welding Company, Cleveland, Ohio, a corporation of Ohio Original No. 2,492,879, dated December 27, 1949, Serial No. 91, January 2, 1948. Application for reissue March 1, 1950, Serial No. 146,941

10 Claims. (Cl. 74—611)

Matter enclosed in heavy brackets [ ] appears in the original patent but forms no part of this reissue specification; matter printed in italics indicates the additions made by reissue

The present invention relates generally, as indicated, to a chain guard, and more especially to a chain guard which is adapted to be mounted on a bicycle for protecting the leg and foot of the driver thereof from chain grease and injury, as well as precluding damage to his wearing apparel by reason of the same becoming caught between the chain and the sprocket wheels over which such chain is trained. Said chain guard also serves as an ornamental accessory to a bicycle whereby to enhance the appearance and streamlining thereof.

One of the principal objects of this invention is to provide a chain guard so formed that the aforesaid purposes may be effectually attained.

Another object is to provide a novel form of bracket on the chain guard for enabling convenient mounting thereof to a bicycle of conventional form.

Another object is to provide a novel form of bracket which imparts rigidity to the chain guard body whereby the latter may be fabricated from relatively light-weight stock.

Another object is to provide a chain guard body and bracket assembly which assures proper mounting with one end of the guard disposed concentrically with respect to the crank-driven sprocket wheel of the bicycle.

Another object is to provide a chain guard which extends rearwardly over the upper side of the chain to a point between the rear fork frame members so as to substantially overlie the straight length of chain between the sprocket wheels over which such chain is trained.

Other objects and advantages will become apparent as the following description proceeds.

To the accomplishment of the foregoing and related ends, said invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing—

Fig. 1 is a side elevation view of a preferred embodiment of the invention;

Fig. 2 is a front elevation view as viewed from the righthand end of Fig. 1;

Fig. 3 is a rear end elevation view as viewed from the lefthand end of Fig. 1;

Fig. 4 is a vertical cross section view taken substantially along the line 4—4, Fig. 1;

Fig. 5 is a side elevation view of a preferred form of bracket illustrating the same in its original form as punched or stamped from sheet stock;

Fig. 6 is a cross section view of the bracket taken substantially along the line 6—6, Fig. 5; and Fig. 7 is a perspective view of a completely formed bracket.

Insofar as the bicycle to which the chain guard constituting the present invention is adapted to be mounted is concerned, only such portions thereof which are pertinent to the present disclosure have been included. Thus, the bicycle is generally illustrated as comprising a frame including a rear fork member 1 with frame members 2 and 3 connected thereto and a hub portion 4 with frame members 5 and 6 projecting radially therefrom.

Each side of such rear fork preferably includes a fork member 1 provided with projections 8 of oblong cross section over which the correspondingly shaped ends of the tubular frame members 2 and 3 are fitted, said members 1, 2, and 3 usually being securely joined together as by welding, for example. Between said fork is a coaster brake or other free-wheeling drive unit (not shown) which includes a toothed sprocket wheel 9, the axle 10 of such unit being longitudinally adjustable in an upwardly inclined slot 11 formed in each member 1. Such adjustment is effected as by a screw 12 having threaded engagement with said member 1 and provided with an end engageable with said axle 10. As is apparent, manipulation of said screw enables adjustment of the tension of the chain 14 trained around said sprocket wheel 9. Such adjustable assemblage also enables disengagement of the chain 14 from the sprocket wheel 9 whereby the coaster brake and the rear wheel thereabout may be removed from the bicycle frame.

The hub 4 previously referred to, is adapted to rotatably support a crank driven sprocket wheel 15 therein with the chain 14 trained thereover.

Referring now to the chain guard which is adapted to be mounted onto a bicycle of the type just described, the same is illustrated as comprising a guard body 16 of generally J-shaped cross section as shown in Fig. 4 and preferably formed as by stamping and drawing operations from relatively thin sheet metal stock or the like. Said body is formed with a longitudinally extending portion 17 disposed along the upper side of said chain 14 and a laterally or downwardly extending portion 18 at its forward end which partially encircles the sprocket wheel 15.

For mounting the forward end of the guard body 16 to a bicycle and for rendering the portions 17 and 18 rigid relative to one another even though the body be fabricated from relatively thin stock, there is secured to said body a bracket 19 which includes an intermediate arcuate portion 20 which engages and encircles a portion of said hub 4 and radially projecting arms 21 and 23 which respectively include bent ends 24 and 25 connected as by welding to the portions 17 and 18 of said body 16. Said arms 21 and 23 and said arcuate portion 20 are rendered rigid relative to one another in a vertical plane as by a stiffening rib 26 formed therein so as to extend longitudinally of said arms and arcuately along said intermediate portion.

The radial arm 21 of said bracket 19 is formed with a contractible band 27 disposed around the frame member 5 which is contracted into frictional engagement with said frame member as by the bolt and nut assemblage 28 which is operative to draw the free ends of said band together.

In Fig. 5 there is illustrated the unbent form of said bracket 19 as punched from sheet metal stock or the like, and in Fig. 7 said bracket is shown in its final bent form ready to be secured to the chain guard body 16.

It is now evident that by reason of the specific form of bracket just described, the chain guard will be accurately positioned concentric relative to the sprocket wheel 15 and generally parallel to the upper side of the chain 14, by reason of the engagement of the intermediate portion 20 of the bracket with the hub 4 and the gripping engagement of the contractible band 27 with the upwardly inclined frame member 5. Furthermore, the connection of said bracket 19 to both the longitudinally and laterally extending portions 17 and 18 of said body 16 assures that such portions will be retained in a co-planar relation to one another.

*It is to be noted that the longitudinally and laterally extending portions 17 and 18 of said guard body 16 partly overlie one side of the sprocket wheel 15 and that the arms 21 and 23 and intermediate portion 20 of said bracket 19 are transversely spaced from the portions of the body which overlie one side of wheel 15 whereby to be disposed on the opposite side of said wheel 15. Moreover, the intermediate portion 20 of said bracket 19 peripherally engages the hub 4 at regions less than 180° apart whereby said guard assembly may be readily installed in proper position over the sprocket wheel 15 and chain 14 without necessitating removal of either of the latter parts of the bicycle.*

The rear end of the chain guard body 16 has welded or otherwise secured thereto a curved bracket 29 disposed inside of the fork member 1 and mounted to the latter as by a screw 30 through said member 1 having threaded engagement with the lower end of said bracket. Said fork member 1 is preferably formed with a slot (not shown) elongated in a generally horizontal direction through which said screw 30 passes whereby to provide a clearance to accommodate variations in the dimensions of the bicycle frame and variations in the distance between the brackets 19 and 29 of the chain guard.

By way of summary, it can be seen that the present invention provides a simple but efficient chain guard which may be readily mounted onto a bicycle of conventional form and which is so formed that it can be mounted onto the bicycle in only a proper position clearing the chain and the sprockets. Also, said guard is of a streamlined ornamental form whereby when accurately mounted as aforesaid, enhances the appearance of the bicycle. A further point to be borne in mind is that in view of the novel form of bracket and the fender-like design of the guard body, said body may be fabricated from light-weight stock but yet the same will have adequate strength and will be firmly held in proper position on the bicycle against deformation.

Other modes of applying the principle of the invention may be employed, change being made as regards the details described, provided the features stated in any of the following claims, or the equivalent of such, be employed.

I therefore particularly point out and distinctly claim as my invention:

1. A guard for a chain or the like trained over wheels rotatable in spaced apart supports, one of which wheel supports includes a hub and a frame member projecting radially therefrom, comprising a body including a longitudinally extending portion adapted to be disposed along one side of such chain or the like and a laterally extending portion at one end adapted to partly encircle one of such wheels, a bracket at such end of said body provided with a portion adapted to at least partly encircle such hub and radially projecting arms respectively connected to such laterally and longitudinally extending portion of said body, and clamping means on one of said arms for attaching said bracket to such frame member.

2. A guard for a chain or the like trained over wheels rotatable in spaced apart supports, one of which wheel supports includes a hub and a frame member projecting radially therefrom, comprising a body including a longitudinally extending portion adapted to be disposed along one side of such chain or the like and a laterally extending portion at one end adapted to partly encircle one of such wheels, a bracket at such end of said body provided with a portion adapted to at least partly encircle such hub and radially projecting arms respectively connected to such laterally and longitudinally extending portion of said body, and clamping means on one of said arms for attaching said bracket to such frame member, said last-named means comprising a contractible band on said bracket adapted to encircle such frame member, and screw means operative to contract said band.

3. A bracket for a chain guard body on bicycles of the type including a hub for a crank driven sprocket wheel and a frame member projecting radially from such hub, comprising an intermediate curved portion adapted to at least partly encircle such hub and radially extending arm portions having their outer ends adapted for connection to such chain guard body, and clamping means on one of said arms for attaching said bracket to such frame member.

4. A bracket for a chain guard body on bicycles of the type including a hub for a crank driven sprocket wheel and a frame member projecting radially from such hub, comprising an intermediate curved portion adapted to at least partly encircle such hub and radially extending arm portions having their outer ends adapted for connection to such chain guard body, a contractible band on one of said arms adapted to encircle such frame member, and clamping means on said band for contracting the same.

5. A bracket for a chain guard body on bicycles of the type including a hub for a crank driven sprocket wheel and a frame member projecting radially from such hub, comprising an intermediate curved portion adapted to at least partly encircle such hub and radially extending arm portions having their outer ends adapted for connection to such chain guard body, a contractible band on one of said arms adapted to encircle such frame member, and means on said band for contracting the same, said bracket being formed with a stiffening rib extending along such arms and intermediate portion thereof.

6. A chain guard comprising a body of generally J-shaped cross-section and formed with coplanar longitudinally and laterally extending portions, a bracket on said body formed with an intermediate curved portion and radially extending arms with bent end portions respectively connected to the longitudinally and laterally extending portions of said body, and a contractible band on one of such arms between the ends thereof.

*7. A guard for a bicycle chain which is trained over wheels rotatable in spaced apart supports, one of which wheel supports includes a hub, comprising a body formed with longitudinally and laterally extending portions respectively adapted to be disposed along one side of such chain and to partly encircle and overlie one side of the wheel rotatable in the last-named support, a bracket generally in transversely spaced relationship to the aforesaid portions of said body and adapted to be generally disposed on the opposite side of such one wheel from said body, an intermediate portion of said bracket being adapted to peripherally engage such hub to predeterminedly position said body relative to the hub, said bracket further including radial extensions respectively secured to the aforesaid portions of said body and also adapted to be disposed on said opposite side of such one wheel, the intermediate portion of said bracket being formed to peripherally engage such hub at regions less than 180° apart whereby said guard may be positioned as aforesaid by movement in a plane parallel to the plane of such wheel and without necessitating disassembly of such wheel from its support.*

*8. A guard for a bicycle chain which is trained over wheels rotatable in spaced apart supports, one of which wheel supports includes a hub, comprising a body formed with longitudinally and laterally extending portions respectively adapted to be disposed along one side of such chain and to partly encircle and overlie one side of the wheel rotatable in the last-named support, a bracket generally in transversely spaced relationship to the aforesaid portions of said body and adapted to be generally disposed on the opposite side of such one wheel from said body, an intermediate portion of said bracket being adapted to peripherally engage such hub to predeterminedly position said body relative to the hub, said bracket further including radial extensions respectively secured to the aforesaid portions of said body and also adapted to be disposed on said opposite side of such one wheel, said bracket being formed with a reinforcing rib in a plane transverse to such one wheel to oppose relative twisting of the longitudinally and laterally extending portions of said body, the intermediate portion of said bracket being formed to peripherally engage such hub at regions less than 180° apart whereby said guard may be positioned as aforesaid by movement in a plane parallel to the plane of such wheel and without necessitating disassembly of such wheel from its support.*

*9. A guard for a bicycle chain which is trained over wheels rotatable in spaced apart supports, one of which wheel supports includes a hub, comprising a body formed with longitudinally and laterally extending portions respectively adapted to be disposed along one side of such chain and to partly encircle and overlie one side of the wheel rotatable in the last-named support, a bracket generally in transversely spaced relationship to the aforesaid portions of said body and adapted to be generally disposed on the opposite side of such one wheel from said body, an intermediate portion of said bracket being adapted to peripherally engage such hub to predeterminedly position said body relative to the hub, said bracket further including radial extensions respectively secured to the aforesaid portions of said body and also adapted to be disposed on said opposite side of such one wheel, and means for securing said bracket to the above-referred to wheel support in a position with its intermediate portion engaged with such hub as aforesaid, the intermediate portion of said bracket being formed to peripherally engage such hub at regions less than 180° apart whereby said guard may be positioned as aforesaid by movement in a plane parallel to the plane of such wheel and without necessitating disassembly of such wheel from its support.*

*10. A guard for a chain or the like trained over wheels rotatable in spaced apart supports, one of which wheel supports includes a hub and a frame member projecting radially therefrom, comprising a body including a longitudinally extending portion adapted to be disposed along one side of such chain or the like and a laterally extending portion at one end adapted to partly encircle one of such wheels, a bracket at such end of said body provided with a portion adapted to at least partly encircle such hub and radially projecting arms respectively connected to such laterally and longitudinally extending portion of said body, and means on one of said arms for attaching said bracket to such frame member.*

HOMER L. MUELLER.

REFERENCES CITED

The following references are of record in the file of this patent or the original patent.

UNITED STATES PATENTS

| Number | Name | Date |
|---|---|---|
| In original patent: | | |
| 611,076 | Nies | Sept. 20, 1898 |
| In reissue: | | |
| 599,884 | Wills | Mar. 1, 1898 |

FOREIGN PATENTS

| Number | Country | Date |
|---|---|---|
| In original patents: | | |
| 232,729 | Germany | Mar. 20, 1911 |
| 467,533 | Germany | Oct. 27, 1928 |
| In reissue: | | |
| 529,861 | France | Sept. 17, 1921 |
| 266,482 | Italy | July 30, 1929 |